US006433802B1

United States Patent
Ladd

(10) Patent No.: US 6,433,802 B1
(45) Date of Patent: *Aug. 13, 2002

(54) PARALLEL PROGRAMMING DEVELOPMENT ENVIRONMENT

(75) Inventor: Patrick G. Ladd, San Marcos, CA (US)

(73) Assignee: NCR Corporation, Dayton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/222,482

(22) Filed: Dec. 29, 1998

(51) Int. Cl.⁷ .................................................. G06F 3/14
(52) U.S. Cl. ........................ 345/853; 345/839; 345/835; 345/838; 345/762; 717/1; 717/6
(58) Field of Search ................................. 345/349, 348, 345/502, 505, 506, 966, 967, 970, 853, 839, 835; 712/10, 21, 20, 22; 717/1, 6

(56) References Cited

U.S. PATENT DOCUMENTS

| | | | | |
|---|---|---|---|---|
| 5,226,120 A | * | 7/1993 | Brown et al. ................ 709/224 |
| 5,237,691 A | * | 8/1993 | Robinson et al. ............ 395/703 |
| 5,276,789 A | | 1/1994 | Besaw et al. ................ 395/140 |
| 5,295,244 A | | 3/1994 | Dev et al. .................... 395/161 |
| 5,349,873 A | * | 9/1994 | Omura et al. ............. 73/862.68 |
| 5,535,393 A | * | 7/1996 | Reeve et al. ................. 395/706 |
| 5,768,594 A | * | 6/1998 | Blelloch et al. ............. 395/706 |
| 5,852,449 A | * | 12/1998 | Esslinger et al. ............ 345/473 |
| 5,877,764 A | * | 3/1999 | Feitelson et al. ............ 345/347 |
| 5,948,055 A | * | 9/1999 | Pulsipher et al. ............ 709/202 |
| 5,999,729 A | * | 12/1999 | Tabloski, Jr. et al. ........ 395/701 |
| 6,041,347 A | * | 3/2000 | Harsham et al. ............. 709/220 |
| 6,057,839 A | * | 5/2000 | Advani et al. ............... 345/341 |
| 6,106,575 A | * | 8/2000 | Hardwick ....................... 717/6 |
| 6,108,702 A | * | 8/2000 | Wood .......................... 709/224 |

\* cited by examiner

Primary Examiner—Kristine Kincaid
Assistant Examiner—Thomas T. Nguyen
(74) Attorney, Agent, or Firm—Gates & Cooper

(57) ABSTRACT

A method, apparatus, and article of manufacture for creating a parallel programming development environment. The environment comprises a graphical user interface, that contains a system screen, an application screen, a code generator, a process distributor, and an applications monitor. The system and application screens are displayed on the monitor and are used to display the topology of the computer system and for selecting portions of the system for use in a parallel application. The code generator receives a user application file from the application screen and generates programming code based on the contents of the user application file. The process distributor, distributes the executable code within the topology of the computer system as allocated by the user in the application file. The application monitor monitors the user application file and maintains statistics on the user application file.

18 Claims, 4 Drawing Sheets

PARALLEL PROGRAMMING DEVELOPMENT ENVIRONMENT

BACKGROUND OF THE INVENTION

1. Field of the Invention

This is invention relates in general to parallel processor computer systems, and in particular, to a parallel programming development environment used to program parallel processor computer systems.

2. Description of Related Art

Parallel processor computer systems are frequently comprised of an operating system and arrays of individual computers (i.e., processor nodes), each with their own central processing unit (CPU), memory, and data storage unit. Tasks are executed in parallel by utilizing each processor node.

During the execution of a task, a body of work is divided into multiple threads. A thread is a stream of instructions executed by the computer on behalf of a task. As an analogy, a task such as an orchestra performing a symphony can be decomposed into many threads which would be the individual musicians, each playing their part.

Typically, in a parallel processor computer system, each thread is allocated to a different processor node. Each of these threads is then executed in parallel at their respective separate nodes. For instance, three threads can occupy and execute simultaneously on three different nodes at the same time.

Although parallel processing has merits, there are shortcomings. Conventional processing techniques may result in an inefficient use of the available hardware. Industry standard libraries, such as the Message Passing Interface (MPI) have made parallel programming even more difficult because the MPI standard is programming language dependent. This dependency creates problems for computer systems that perform some of their programming tasks in one language and other tasks in another language, because present day parallel programming efforts will then be unable to interact with programming that is written in two different programming languages. This makes parallel programming efforts more costly and more time consuming.

It can be seen, then, that there is a need in the art for a method to develop parallel programming that can be used with multiple computer programming languages. Further, there is a need for a parallel programming development environment that will be lest costly. There is also a need for a parallel programming development environment that is less time consuming. There is also a need in the art for modifications to conventional techniques that exploit the hardware available in parallel processor computer systems.

SUMMARY OF THE INVENTION

To overcome the limitations in the prior art described above, and to overcome other limitations that will become apparent upon reading and understanding the present specification, the present invention discloses a method, apparatus, and article of manufacture for creating a parallel programming development environment. The environment comprises a graphical user interface, that contains a system screen, an application screen, a code generator, a process distributor, and an applications monitor. The system and application screens are displayed on the monitor and are used to display the topology of the computer system and for selecting portions of the system for use in a parallel application. The code generator receives a user application file from the application screen and generates programming code based on the contents of the user application file. The process distributor, distributes the executable code within the topology of the computer system as allocated by the user in the application file. The application monitor monitors the user application file and maintains statistics on the user application file.

An object of the present invention is to provide more efficient usage of parallel processor computer systems. Another benefit is higher system availability without undue programming overhead in the application. Still another benefit of the present invention is its ability to provide faster and more cost effective parallel programming development.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to the accompanying detailed description, in which there is illustrated and described specific examples of a method, apparatus, and article of manufacture in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
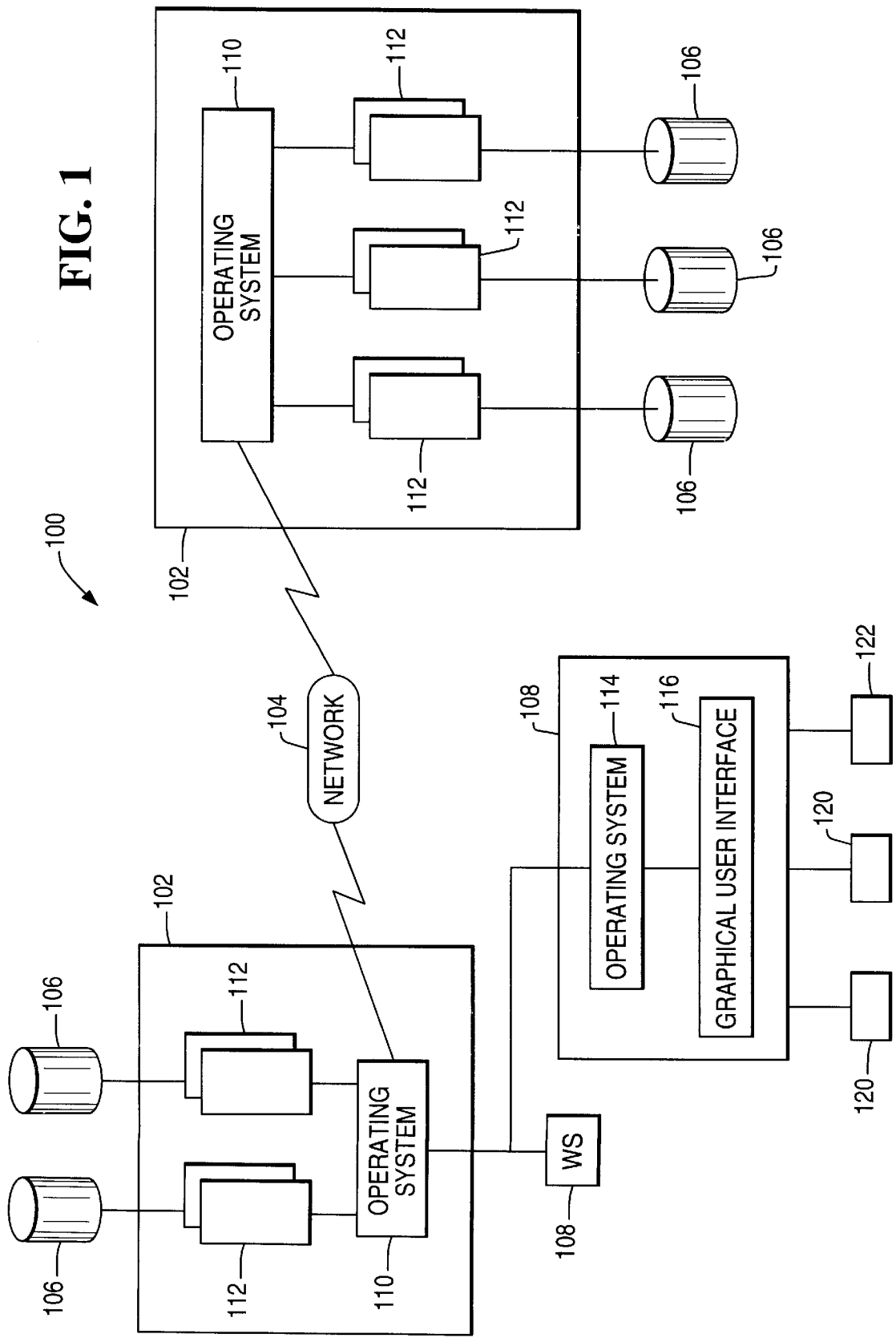
FIG. 1 is a block diagram that illustrates an exemplary hardware environment that could be used with the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes maybe made without departing from the scope of the present invention.

Overview

The present invention discloses a method, apparatus, and article of manufacture for creating a parallel programming development environment. The environment comprises a graphical user interface, that contains a system screen, an application screen, a code generator, a process distributor, and an applications monitor. The system and application screens are displayed on the monitor and are used to display the topology of the computer system and for selecting portions of the system for use in a parallel application. The code generator receives a user application file from the application screen and generates programming code based on the contents of the user application file. The process distributor distributes the executable code within the topology of the computer system as allocated by the user in the application file. The application monitor monitors the user application file and maintains statistics on the user application file.

The present invention provides a Graphical User Interface (GUI) that is used to display and create a graphical representation of the desired parallel programming application. The present invention also displays a diagram of the nodes of the system and how they are interconnected, so that programmers can take advantage of the architecture of the system that is being programmed. The present invention allows users to route processes and/or threads to specific nodes, determine the use of shared memory devices, and customize an application prior to generation of computer programming code.

The present invention provides a graphical interface to users and offers objects such as Groups, Links, and Processes, e.g., root and children, that can be dragged and dropped, connected, and customized in order to form a graphical representation of the desired parallel application. Additionally, on a system screen, the present invention can show a diagram of the nodes in the system and how they are interconnected e.g., distributed memory, networked, etc. Users can describe how the application should behave in the system in order to take advantage of the architecture shown on the system screen. This activity can entail the determination of process distribution to specific nodes, or how shared memory is to be used. The present invention saves this information and uses the information for code generation and for process distribution when the application is started.

When the overall application is described, individual processes are designed using object-oriented software design techniques with the addition of paradigm specific, e.g., MPI objects. A tool incorporating a modeling language can be used, but in order to maintain ease of parallel application programmability a library of paradigm specific objects must be made available.

With the application completely described, the user can generate language specific codes for a specific standardized parallel programming paradigm, such as MPI. The present invention can be used to start the application by distributing the processes and signal the start of their execution. Finally, the present invention can be used to monitor an application in order to gather statistics, displayed graphically in real-time, for correct operation and performance evaluation.

Hardware Environment

FIG. 1 illustrates an exemplary computer hardware environment that could be used with the present invention. In the exemplary computer hardware environment, a computer system 100 is comprised of one or more processors or nodes 102 interconnected by a network 104. Each of the nodes 102 is typically a symmetric multi-processor (SMP) architecture and is comprised of a plurality of microprocessors, random access memory (RAM), read-only memory (ROM), and other components. It is envisioned that attached to the nodes 102 may be one or more fixed and/or removable data storage units DSUs) 106 and data communications units (DCUs).

Each of the nodes 102 operates under the control of an operating system 110, such as the UNIX™ operating system. Further, each of the nodes 102 executes one or more computer programs 112 under the control of the operating system 110. Generally, the operating system 110 and the computer programs 112 are tangibly embodied in and/or retrieved from RAM ROM, and/or one or more other DSUs 106 or DCUs. Further, both the operating system 110 and the computer programs 112 are loaded into RAM for execution by the node 102. In any embodiment, both the operating system 110 and the computer programs 112 comprise instructions which, when read and executed by the node 102, causes the node 102 to perform the steps necessary to execute the steps or elements of the present invention.

In the exemplary environment of FIG. 1, a client-server architecture is disclosed. At least one of the nodes 102 provide the connection to client systems operating on workstations 108. Operators of the system 100 use a workstation 108 or terminal to transmit electrical signals to and from server systems operating on the node 102 in the system 100, wherein the electrical signals represent commands for performing various functions in the system 100, such as search and retrieval functions against the databases. The present invention has application to any function or software that can be performed by a system 100.

The workstation 108 usually operates under the control of an operating system 114. The present invention is usually implemented in one or more Graphical User Interfaces (GUIs) 116 that operate under the control of and in conjunction with the operating system 114.

For human interface with the workstation 108, attached to the workstation 108 is a keyboard 118, a mouse or other pointing device 120, and a monitor 122. The GUIs 116 are displayed on monitor 122 and the user can interact with the GUIs 116 by using the keyboard 118 and/or the pointing device 120 to command the workstation 108 to perform certain tasks.

The present invention uses the GUI 116 to help resolve the problem associated with tasks that do not easily lend themselves to being divided into parallel processing subtasks. Methods which require knowledge of the physical configuration of the system 100 typically present undesirable levels of software complexity and platform dependencies. The present invention minimizes the levels of software complexity by presenting the user with a graphical representation of the system 100 and allowing the user to program the system 100 in a graphical manner. Supporting this global knowledge requires heavy use of the network 104 between the nodes 102 of the system 100.

Generally, the GUI 116 comprises instructions and/or data that are embodied in or retrievable from a computer-readable device, medium, or carrier, e.g., the data storage device 106, a remote device coupled to the workstation 108 via the node 102, etc. Moreover, these instructions and/or data, when read, executed, and/or interpreted by the workstation 108 cause the workstation 108 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Many modifications may be made to this configuration without departing from the scope of the present invention.

Any combination of the above components, or any number of different components, including computer programs, peripherals, and other devices, may be used to implement the present invention, so long as similar functions are performed thereby.

Relationships and Operation

Figure 2:
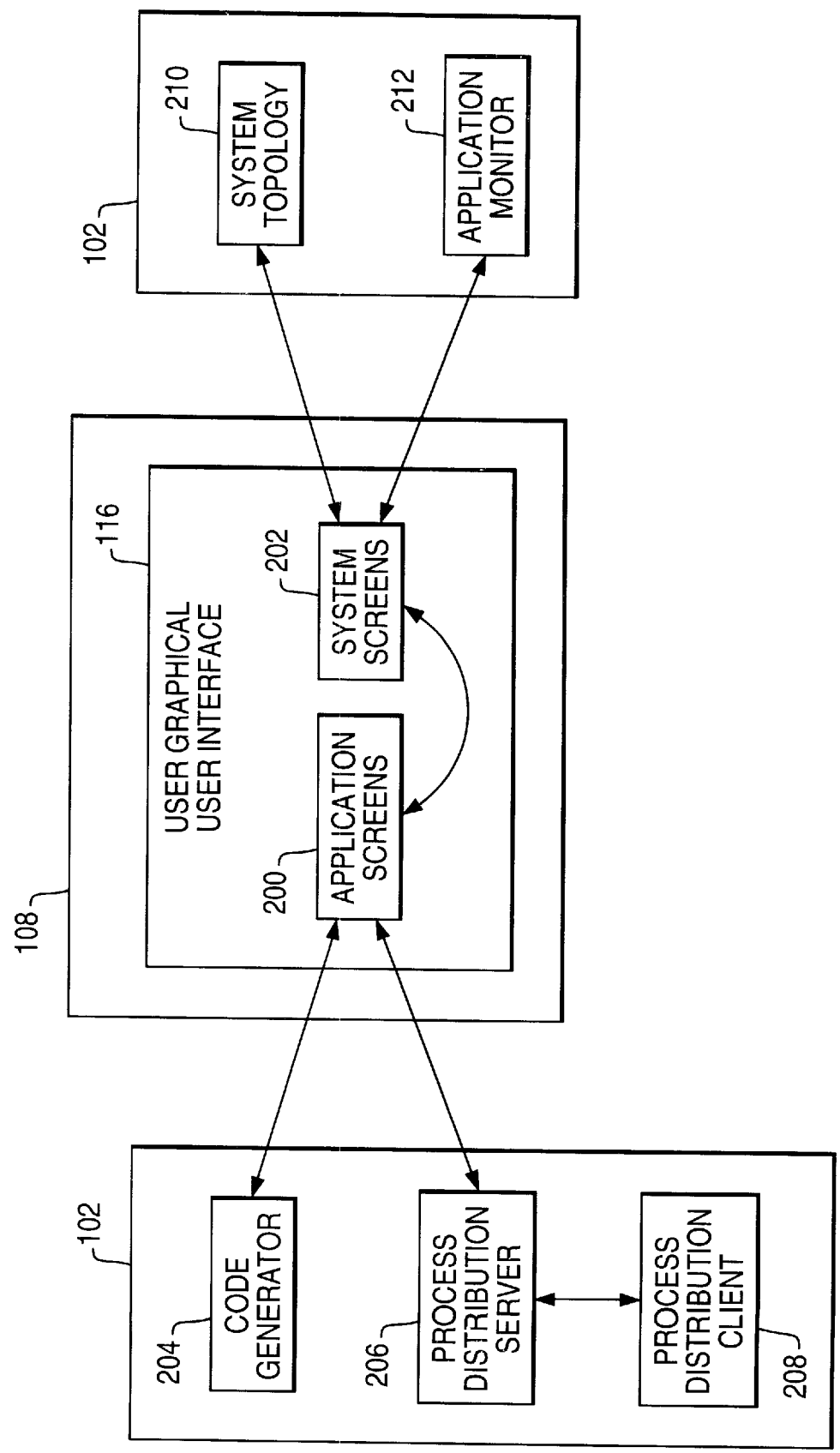
FIG. 2 illustrates the components and interrelationship between the components of the development environment of the present invention.

FIG. 2 illustrates the components and interrelationship between the components of the development environment of the present invention.

The present invention comprises a user GUI 116, which includes application screens 200 and system screens 202. The user GUI 116 provides an interface for the user to create parallel applications 112, generate code for the parallel applications 112, distribute the parallel applications 112, run the parallel applications 112, and monitor the progress of the parallel applications 112.

To perform all of the monitoring, running, distribution, creation, and generation tasks, the User GUI 116 is divided into at least two parts. The first part is the application screens 200. The application screens 200 provide an environment for users to piece together a parallel application using objects that correspond to pieces of the application. Once a user has pieced together the objects using the application screens 200, the application screens 200, through the user GUI 116, pass the user applications 112 to the code generator 204 and process distribution server 206.

The system screens 202 comprise another part of the user GUI 116, and display current system 100 topology in terms of nodes 102, network 104 connections (e.g., clustered, MPP, SMP, etc.) and shared memory architectures. The system screens 202, through the user GUI 116, pass the system 100 topology information to the applications screens 200 for use in parallel application 112 creation.

The code generator 204 accepts application 112 information files for application 112 behavior from the application screens 200 and generates language specific code for a particular parallel programming paradigm, such as MPI. Many different computer languages, e.g., C, C++, Fortran, Cobol, etc., along with many different parallel programming paradigms, are supportable by the code generator 204.

The process distribution server 206 distributes process executables to nodes 102 as defined by the system 100 architecture described by the user. The process distribution server 206 also sends processes and applications 112 to process distribution clients 208 on nodes 112 identified in application 112 groups. The process distribution server 206 also signals the process distribution client 208 to execute appropriate processes and/or applications 112.

The system topology 210 updates the graphical representation of the system 100 interconnections and distributed memory layout upon user request. The system 100 information is used to determine the architecture model of the application 112 and allows for determination of the number of parallel processes to use and where to execute them (e.g., which node 102 or workstation 108).

The application monitor 212 monitors the start, progress, and completion of a parallel application 112, maintains statistics during the execution of the parallel application 112, and calculates system 100 performance during and after the execution of application 112. The application monitor 212 also has a screen within system screens 202 that shows real time activity and statistical updates of an application 112 during execution.

Logic of the Management Interface

Figure 3:
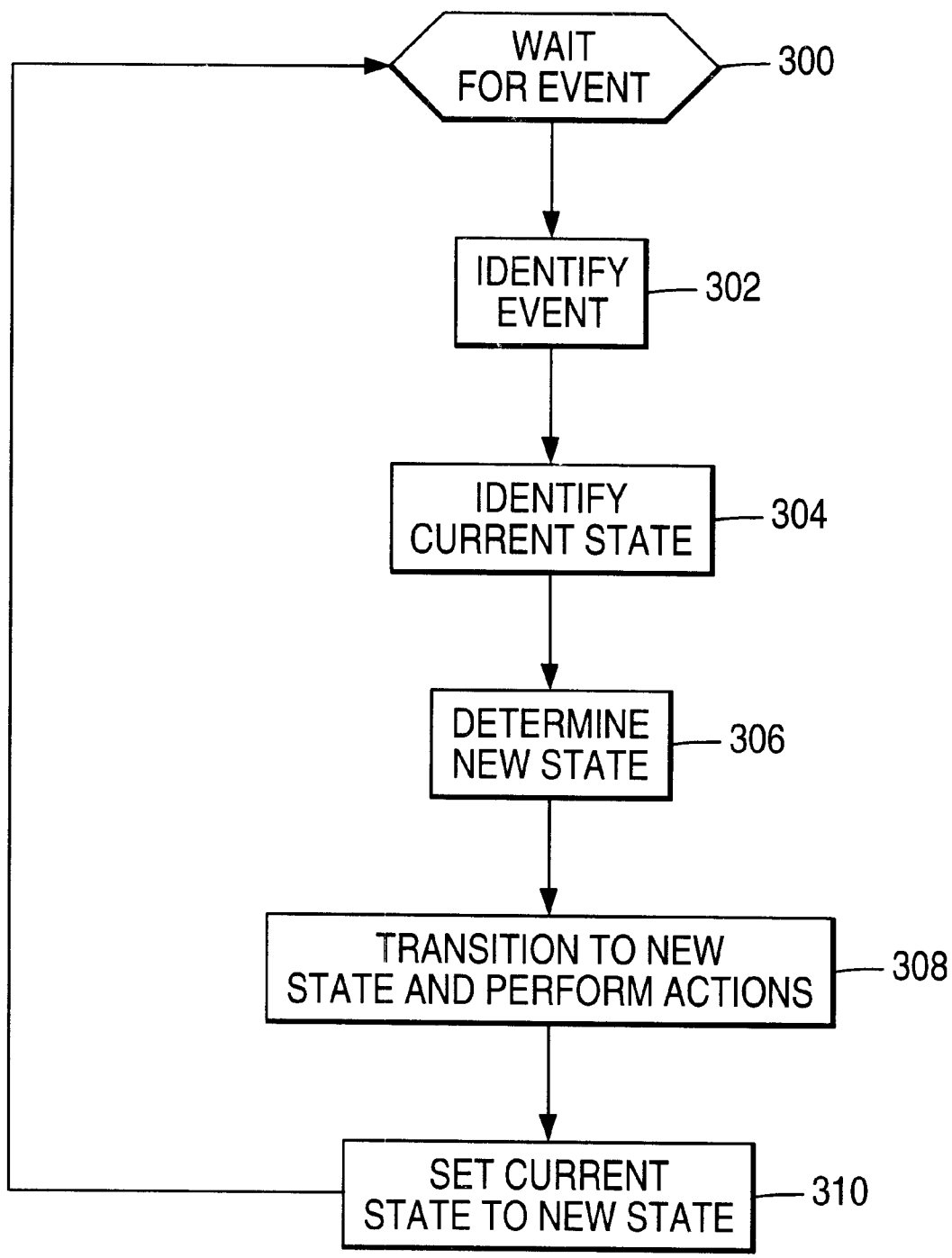
FIG. 3 is a flowchart that illustrates the general logic of a message or event-driven node performing the steps of the present invention.

FIG. 3 is a flowchart that illustrates the general logic of a message or event-driven node 102 performing the steps of the present invention. In such a computer 102, operations are performed when transitions are made, based upon the receipt of messages or events, from present or current states to new states.

Generally, the flowchart begins by waiting at block 300 for an event (e.g., a mouse button click). It should be appreciated that during this time, other operating system tasks, e.g., file, memory, and video tasks, etc., may also be carried out. When an event occurs, control passes to block 302 to identify the event. Based upon the event, as well as the current state of the system determined in block 304, a new state is determined in block 306. In block 308, the logic transitions to the new state and performs any actions required for the transition. In block 310, the current state is set to the previously determined new state, and control returns to block 300 to wait for more input events.

The specific operations that are performed by block 308 when transitioning between states will vary depending upon the current state and the event. The various operations required to implement and maintain the workstation 108 and GUI 116 of the present invention represent particular events handled by the logic. However, it should be appreciated that these operations represent merely a subset of all of the events handled by the node 102.

Figure 4:
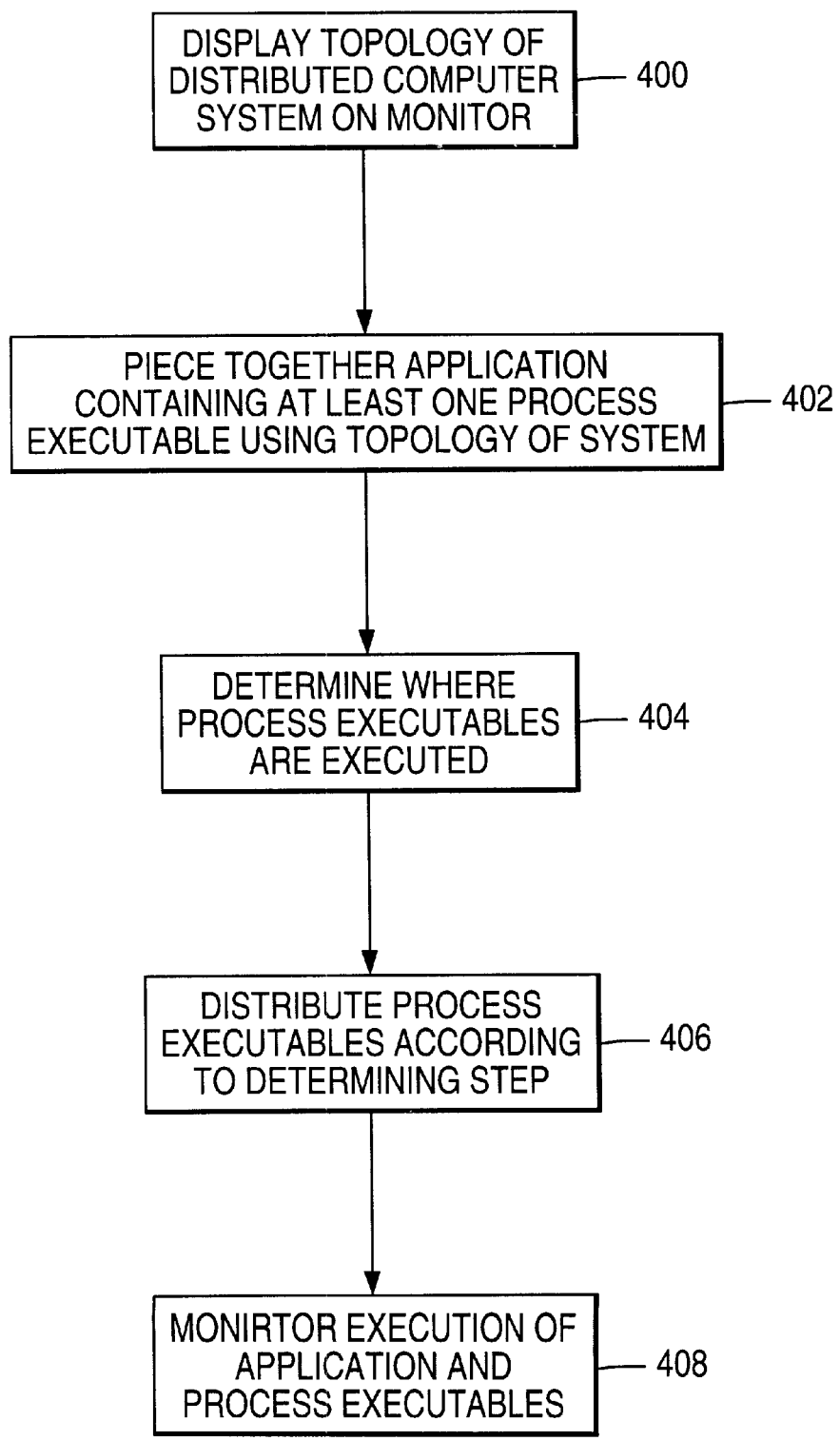
FIG. 4 is a flowchart that illustrates exemplary logic performed by the present invention.

FIG. 4 is a flowchart that illustrates exemplary logic performed by the present invention.

Block 400 represents the workstation 108 displaying a topology of the distributed computer system 100 on a monitor 122.

Block 402 represents piecing together an application 112 containing at least one process executable using the topology of the distributed computer system 100.

Block 404 represents determining where, within the topology of the distributed computer system 100, the process executables are executed.

Block 406 represents the node 102 distributing the process executables according to the determining step.

Block 408 represents the node 102 monitoring execution of the pieced together application 112 and the process executables.

Conclusion

This concludes the description of the preferred embodiment of the invention. The following describes some alternative embodiments for accomplishing the present invention. For example, any type of computer, such as a mainframe, minicomputer, or personal computer, could be used with the present invention. In addition, any software program utilizing (either partially or entirely) object-oriented programming or a parallel processing schema could benefit from the present invention.

In summary, the present invention discloses a method, apparatus, and article of manufacture for creating a parallel programming development environment. The environment comprises a graphical user interface that contains a system screen, an application screen, a code generator, a process distributor, and an applications monitor. The system and application screens are displayed on the monitor and are used to display the topology of the computer system and for selecting portions of the system for use in a parallel application. The code generator receives a user application file from the application screen and generates programming code based on the contents of the user application file. The process distributor, distributes the executable code within the topology of the computer system as allocated by the user in the application file. The application monitor monitors the user application file and maintains statistics on the user application file.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A graphical user interface for a parallel programming development environment on a distributed computer system, comprising:

(a) a system screen, displayed on a monitor attached to the distributed computer system, for displaying a graphical representation of a system topology of the distributed computer system in terms of nodes, system network connections, and shared memory architecture layouts, wherein the distributed computer system has more than one node;

(b) the system topology of the distributed computer system that is used to update the graphical representation, displayed in the system screen, of system network connections and shared memory architecture layouts at a request of a user;

(c) an application screen, displayed on the monitor attached to a node of the distributed computer system, for:

(i) receiving the system topology of the distributed computer system from the system screen;

(ii) forming a graphical representation of a desired parallel application by graphically piecing together the desired parallel application using the system topology, the parallel application including at least one process executable to be executed by a specific client on a node within the system topology, wherein the desired parallel application is pieced together using objects comprising groups, links, and processes that can be dragged and dropped, connected, and customized; and (iii) graphically determining how shared memory is to be used;

(d) a code generator, for receiving the pieced together parallel application from the application screen and for generating programming code;

(e) a process distributor, for distributing at least one process executable to the specific client on the node within the system topology of the distributed computer system as in accordance with the graphical representation in the application screen and for signaling the specific client to execute the distributed process executable in accordance with the graphical representation in the application screen; and (f) an application monitor, for monitoring the pieced together application.

2. The graphical user interface of claim 1, wherein the application monitor maintains statistics on an execution of the pieced together application.

3. The graphical user interface of claim 1, wherein the application monitor calculates performance statistics on an execution of the pieced together application.

4. The graphical user interface of claim 1, wherein each object corresponds to a piece of the application.

5. The graphical user interface of claim 1, wherein the code generator generates code for a particular parallel programming paradigm.

6. The graphical user interface of claim 1, wherein the code generator generates language specific code.

7. A method for developing parallel programming on a distributed computer system, comprising:

displaying a graphical representation of a system topology of the distributed computer system in terms of nodes, system connections, and shared memory architecture layouts on a monitor, wherein the distributed computer system has more than one node;

updating the displayed graphical representation of the system topology at the request of the user, by updating the network connections and shared memory architecture layouts;

forming a graphical representation of a desired parallel application by graphically piecing together the desired parallel application containing at least one process executable to be executed by a specific client on a node within the system topology of the distributed computer system, wherein the desired parallel application is pieced together using objects comprising groups, links, and processes that can be dragged and dropped, connected, and customized;

graphically determining how shared memory is to be used;

distributing the process executable to the specific client in accordance with the graphical representation;

signaling the specific client to execute the distributed process executable in accordance with the graphical representation; and monitoring execution of the pieced together application and the process executable.

8. The method of claim 7, further comprising maintaining statistics on an execution of the pieced together application.

9. The method of claim 7, further comprising calculating performance statistics on an execution of the pieced together application.

10. The method of claim 7, wherein each object corresponds to a piece of the application.

11. The method of claim 7, further comprising generating code for a particular parallel programming paradigm.

12. The method of claim 7, further comprising generating language specific code.

13. A program storage device, readable by a computer, tangibly embodying one or more programs of instructions executable by the computer to perform a method of developing parallel programming on a distributed computer system, the method comprising:

displaying a graphical representation of a system topology of the distributed computer system in terms of nodes, system network connections, and shared memory architecture layouts on a monitor, wherein the distributed computer system has more than one node;

updating the displayed graphical representation of the system topology at the request of a user by updating the network connections and shared memory architecture layouts;

forming a graphical representation of a desired parallel application by graphically piecing together the application using the system topology, the parallel application containing at least one process executable to be executed by a specific client on a node within the system topology of the distributed computer system, wherein the desired parallel application is pieced together using objects such as groups, links, and processes that can be dragged and dropped, connected, and customized;

graphically determining how shared memory is to be used;

distributing the process executable to the specific client on the node;

signaling the specific node to execute the process executable in accordance with the graphical representation; and monitoring execution of the pieced together application and the process executables.

14. The program storage device of claim 13, wherein the method further comprises maintaining statistics on an execution of the pieced together application.

15. The program storage device of claim 13, wherein the method further comprises calculating performance statistics on an execution of the pieced together application.

16. The program storage device of claim 13, wherein each object corresponds to a piece of the application.

17. The program storage device of claim 13, wherein the method further comprises generating code for a particular parallel programming paradigm.

18. The program storage device of claim 13, wherein the method further comprises generating language specific code.

* * * * *

UNITED STATES PATENT AND TRADEMARK OFFICE
CERTIFICATE OF CORRECTION

PATENT NO. : 6,433,802 B1
DATED : August 13, 2002
INVENTOR(S) : Ladd, P.

It is certified that error appears in the above-identified patent and that said Letters Patent is hereby corrected as shown below:

Column 7,
Line 50, after "system" insert -- network --

Signed and Sealed this

Eleventh Day of January, 2005

JON W. DUDAS
*Director of the United States Patent and Trademark Office*